(No Model.)

G. H. LEWIS.
FURNITURE PAD.

No. 268,697. Patented Dec. 5, 1882.

Witnesses,
John F. C. Prinkert
Fred A. Powell

Inventor:
George H. Lewis
by Crosby & Gregory
attys.

United States Patent Office.

GEORGE H. LEWIS, OF ANDOVER, MASSACHUSETTS.

FURNITURE-PAD.

SPECIFICATION forming part of Letters Patent No. 268,697, dated December 5, 1882.

Application filed September 7, 1882. (No model.)

*To all whom it may concern:*

Be it known that I, GEORGE H. LEWIS, of Andover, county of Essex, State of Massachusetts, have invented an Improvement in Furniture-Pads, of which the following description, in connection with the accompanying drawings, is a specification.

My invention relates to an elastic cushion or pad such as may be employed at the ends of chair-legs or articles of furniture or other similar places to prevent noise and reduce the wear of the carpets, &c. The said cushion consists of a piece of rubber of suitable shape to be applied to the desired articles, the said cushion being provided with a gimlet-pointed or wood screw for fastening it upon said articles, which are usually of wood. In making the cushion, the rubber is molded over the head of an ordinary wood-screw, a suitable core-piece also being provided in the mold to produce a slot in the rubber cushion through which a screw-driver may be inserted to turn the screw into the wood in the usual manner. In order to prevent the rubber cushion from being removed by stretching off over the head of the screw, I provide a washer of substantially non-elastic material—such as coarse cloth or canvas—fitted over the shank of the screw and united to the face of the rubber in the process of vulcanizing it, so as to prevent a sufficient stretching of the said rubber to permit it to be withdrawn from the head of the screw.

Figure 1:
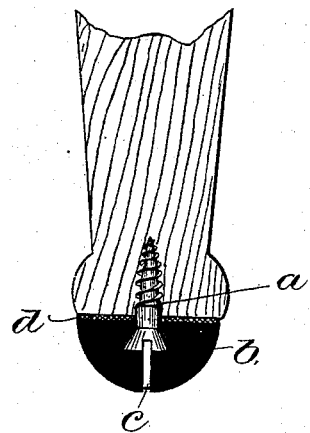
Figure 2:
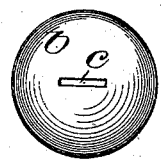

Figure 1 is a longitudinal vertical section of a cushion or pad applied to the leg of a chair or other piece of furniture, and Fig. 2 an under side view thereof.

The said cushion or pad consists essentially of a wood-screw, $a$, comprising the usual threaded or, preferably, gimlet-pointed shank and slotted head to be engaged by a screw driver, and the cushion or pad $b$, of rubber, inclosing the head of the said screw $a$, and provided with a slot or passage, $c$, through which a screw-driver may be inserted to turn the said screw $a$ into the article to which the cushion is to be applied. In order to prevent the rubber from being removed from the head of the screw, the said cushion $b$ is provided with a washer, $d$, of substantially non-elastic material—such as a piece of coarse canvas or fabric—fitted to the shank of the screw and united to the face of the cushion $b$, so as wholly prevent its stretching and the consequent possibility of escaping or being pulled from the said screw-head. In manufacturing the cushion the screw $a$, provided with the washer $d$ on its shank, is placed in one side of a two-part mold, the other side of which is provided with a metallic projection shaped like the end of a screw-driver and entering the slot of the said screw. The said mold is filled with the usual rubber material, which is then vulcanized therein in the usual manner, the rubber firmly uniting with the washer $d$ in the said process of vulcanizing, and tightly inclosing the screw $a$, so as to form in appearance a wood-screw having a large flexible or elastic head of rubber. In case the slot $c$ should not be in line with the slot of the screw-head, the rubber might become detached from the said screw-head, but in the process of turning the screw into the wood the said rubber would rotate until the end of the screw-driver was brought into line with and engaged the slot of the screw $a$, after which it would act positively with the said screw to turn it into the wood.

I claim—

The combination, with the screw having a threaded shank and slotted head, of the slotted rubber cushion inclosing the said head and the non-elastic washer united to the face of the said rubber, substantially as described.

In testimony whereof I have signed my name to this specification in the presence of two subscribing witnesses.

GEORGE H. LEWIS.

Witnesses:
JOS. P. LIVERMORE,
BERNICE J. NOYES.